(12) United States Patent
Laster et al.

(10) Patent No.: US 8,495,982 B2
(45) Date of Patent: Jul. 30, 2013

(54) APPARATUS FOR MIXING FUEL AND AIR IN A COMBUSTION SYSTEM

(75) Inventors: Walter R. Laster, Oviedo, FL (US); Elizabeth R. Colore, Cave Creek, AZ (US); David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 1865 days.

(21) Appl. No.: 11/788,300

(22) Filed: Apr. 19, 2007

(65) Prior Publication Data
US 2013/0167538 A1 Jul. 4, 2013

(51) Int. Cl.
*F02M 35/10* (2006.01)

(52) U.S. Cl.
USPC ........... 123/184.21; 123/294; 60/742; 60/739

(58) Field of Classification Search
USPC ............. 123/184.21, 184.24, 184.25, 184.27, 123/294, 585, 590, 73 AD, 522, 527; 261/40, 261/118; 60/742, 736, 739, 748
See application file for complete search history.

(56) References Cited

U.S. PATENT DOCUMENTS

| | | | | |
|---|---|---|---|---|
| 2,775,238 | A * | 12/1956 | Clark et al. | 126/116 R |
| 4,364,726 | A * | 12/1982 | Forster et al. | 431/215 |
| 5,615,555 | A * | 4/1997 | Mina | 60/742 |
| 5,619,855 | A * | 4/1997 | Burrus | 60/736 |
| 6,092,363 | A * | 7/2000 | Ryan | 60/39.463 |
| 6,240,732 | B1 * | 6/2001 | Allan | 60/739 |
| 6,279,557 | B1 * | 8/2001 | Fischer et al. | 123/585 |
| 6,427,447 | B1 * | 8/2002 | Sowa | 60/737 |
| 6,786,047 | B2 | 9/2004 | Bland et al. | |
| 7,065,972 | B2 * | 6/2006 | Zupanc et al. | 60/748 |
| 2001/0052229 | A1 * | 12/2001 | Tuthill et al. | 60/39.06 |
| 2002/0078690 | A1 * | 6/2002 | Stuttaford et al. | 60/737 |

* cited by examiner

*Primary Examiner* — Noah Kamen
*Assistant Examiner* — Long T Tran

(57) ABSTRACT

A fuel shroud assembly (100) into which fuel (118) is injected for mixing with an air stream (120) in a fuel manifold. The shroud assembly (100) comprises a plurality of parallel fuel scoops (102) each receiving the injected fuel (118). The fuel stream (118) flows through each scoop (102), exiting at an open scoop end (114A). The air stream (120) flows between scoops, creating a shear region proximate each scoop end (114A) where the fuel exits. The shear causes mixing of the air (120) and the fuel (118) streams, wherein the degree of mixing is not dependent on the momentum ratio of the air (120) or fuel (118) streams.

17 Claims, 3 Drawing Sheets

APPARATUS FOR MIXING FUEL AND AIR IN A COMBUSTION SYSTEM

The invention was developed with U.S. Government support under contract number DE-FC-26-03NT41891. The Government therefore has certain rights in the invention.

FIELD OF THE INVENTION

This invention is directed generally to combustion systems, and more particularly to mixing fuel and air for use in the combustion system.

BACKGROUND OF THE INVENTION

Gas (combustion) turbine engines generate power for a variety of applications including land-based electrical power generating plants. The turbines are designed to combust a broad range of hydrocarbon fuels, such as natural gas, kerosene, biomass gas, liquid natural gas, synthetic gas, etc. Gas turbines produce an exhaust stream containing a number of combustion byproducts, many of which are considered atmospheric pollutants. Increasingly stringent regulations have been imposed on the operation of gas turbine power plants in an effort to minimize the production of these gasses. Regulating production of the various forms of nitrogen oxides, collectively known as NOx, is of particular concern.

It is known that gas turbine NOx emissions increase significantly as the combustion temperature rises. One method of limiting the NOx production employs the lean premixed concept where the fuel and combustion air are mixed prior to reaching the combustion zone at a relatively low fuel-to-air ratio. Limiting the peak combustion temperature reduces the NOx emissions. In this design the degree of mixing between the fuel and air is critical to the performance of the combustion system.

Typically, a gas turbine engine comprises one or more injectors for injecting fuel into air (i.e., primary zone air) upstream of a combustor where the fuel burns. The fuel injectors of conventional turbine engines may be arranged in one of at least three different schemes. In a lean premix flame system, the fuel injectors are positioned to inject fuel into the air stream at an upstream location that is sufficiently separated from the flame zone to allow complete mixing of the fuel/air mixture prior to reaching and burning in the flame zone. Fuel injectors are configured in a diffusion flame system to simultaneously mix and burn the fuel and air. In a partially premixed system, the fuel injectors inject fuel upstream of the flame zone a sufficient distance to allow some of the air to mix with the fuel prior to reaching the flame zone. A partially premixed system is a combination of a lean premix flame system and a diffusion flame system.

To avoid local hot spots that produce a high level of NOx emissions, a low-emission gas turbine combustion engine requires thorough mixing of the fuel and air streams prior to reaching the combustion zone. Preferred techniques for mixing the air and fuel streams are dependent on a momentum (mass multiplied by velocity) ratio of the two flow streams. With the current emphasis on alternative gas turbine fuels, it is desired that the gas turbine components function properly with different fuels. Fuel/air mixing apparatuses that rely on the momentum ratio to mix the fuels are satisfactory for only a narrow range of momentum ratios and therefore are limited to certain fuels. For a gas turbine combustor that can perform efficiently using a wide range of fuels, it is necessary to develop a method for fuel air mixing that is independent of the momentum ratio of the gas streams.

One known prior art technique for mixing air and fuel, as illustrated in FIG. 1, comprises a fuel manifold 10 bounding an air stream represented by arrowheads 18. One or more fuel injectors (not shown) inject fuel into the air stream cross flow 18 through a plurality of openings 20 in a surface 10A of the fuel manifold 10, forming a fuel mixing region indicated generally by a reference character 24. Disadvantageously, the extent to which the fuel and air mix depends on the penetration of the injected fuel into the air stream 18, which in turn is determined by the ratio of the momentum of the two streams.

For optimal mixing the fuel should penetrate about ⅔ of the air stream 18. Excessive fuel penetration causes the fuel to strike an interior lower wall surface 10B of the manifold 10, creating a recirculation zone 30 as illustrated in FIG. 2. Poor mixing within the recirculation zone 30 can lead to flashback in the manifold 10.

If the fuel does not penetrate a sufficient distance into the air stream 18, the air/fuel mixture is stratified with a majority of the fuel proximate the upper surface 10A. In this case, the poorly mixed fuel results in a degradation of performance and increased NOx emissions.

The momentum ratio of the fuel and air streams varies according to fuel type, fuel heating value and fuel density. To ensure proper air-fuel mixing, such as when the fuel supplied to the combustion turbine is changed, it is necessary to adjust the size and/or location of the fuel injection openings 20. For a combustion system that operates with many different types of fuel, it may be necessary to utilize more than one fuel manifold, each manifold having differently sized and/or located injection openings for use with a specific fuel type. As is known, current gas turbines must be capable of burning a wide variety of fuels including natural gas, liquid natural gas, syngas and hydrogen. Designing a gas turbine with multiple manifolds, each designed specifically for one fuel type is not a practical solution. Neither is it desired to remove and replace the fuel manifold whenever a different fuel type is to be burned.

The problem of rapidly and thoroughly mixing the fuel and primary zone air has been addressed by the use of swirlers. Axial swirlers are disposed within the fuel injector or external the fuel injector along the fuel flow path to swirl the fuel flow and improve the air-fuel mixing process. A plurality of closely-spaced swirl cups downstream of the fuel injection point can enhance the air-fuel mixing process. Although these prior art techniques have helped to reduce NOx emissions, combustion performance can be further improved by further increasing the efficiency of mixing fuel and primary zone air prior to fuel combustion.

Therefore, there is a need for an air-fuel mixer to further improve the process of mixing fuel and primary zone air. There is a further need for an efficient air-fuel mixer for use with various types of fuels, independent of the fuel momentum as it enters the air flow.

BRIEF SUMMARY OF THE INVENTION

According to one embodiment, the invention comprises a manifold for mixing fuel and air. The manifold further comprises an enclosure defining a first air flow channel through which air is directed, the enclosure bounded by an upper and a lower wall surface; fuel scoops extending from the upper surface into the air flow channel, each fuel scoop defining a fuel flow channel through which fuel is directed, each fuel scoop further defining a plurality of fuel receiving openings for receiving fuel, the fuel directed into the fuel flow channel and exiting the fuel scoops at a fuel outflow opening, adjacent ones of the fuel scoops defining a second air flow channel therebetween, wherein an air stream flows through the second air flow channel in a direction toward the fuel outflow openings and wherein the air stream creates a shear region proximate the fuel outflow openings, and wherein the air stream and the fuel stream mix in the shear region.

BRIEF DESCRIPTION OF THE DRAWINGS

The embodiments of the present invention can be more easily understood and the advantages and uses thereof more readily apparent when the following detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF THE INVENTION

While preferred embodiments of the present invention are described and illustrated herein, it will be obvious that such embodiments are provided by way of example only. Numerous variations, changes and substitutions will occur to those of skill in the art without departing from the invention. Accordingly, it is intended that the invention be limited only by the spirit and scope of the appended claims.

A fuel manifold of an embodiment of the present invention produces acceptable fuel-air mixing for any fuel type, fuel density, fuel heating value and fuel/air momentum ratio, thereby overcoming limitations of prior art fuel manifolds.

Figure 3:
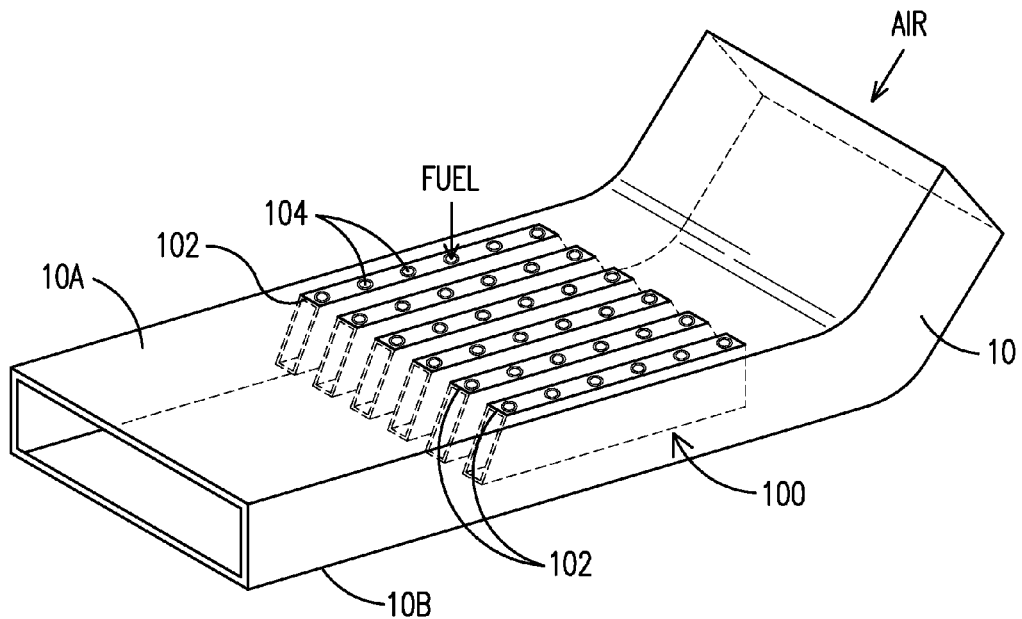
FIG. 3 is a perspective view of a fuel manifold.
Figure 4:
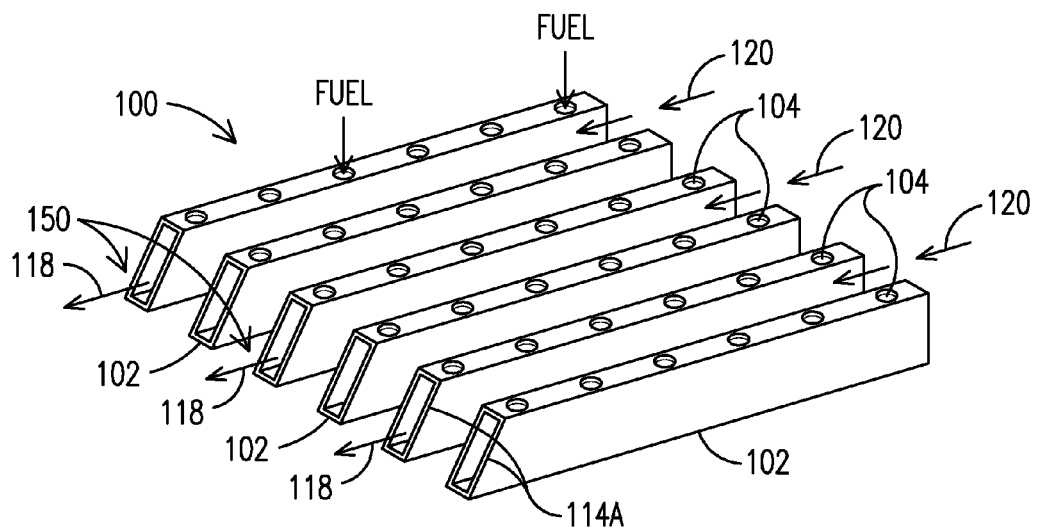
FIG. 4 is a perspective view of a fuel shroud assembly according to one embodiment of the present invention.

According to the present invention, as illustrated in FIGS. 3 and 4, a fuel shroud assembly 100 forces optimal penetration of the fuel jet into the air stream regardless of the momentum ratio of the two streams. The fuel shroud assembly 100 comprises a plurality of parallel fuel scoops 102 each comprising a plurality of fuel injection openings 104 on an upper surface thereof through which a fuel injector (not shown) injects fuel into each one of the scoops 102.

Figure 5:
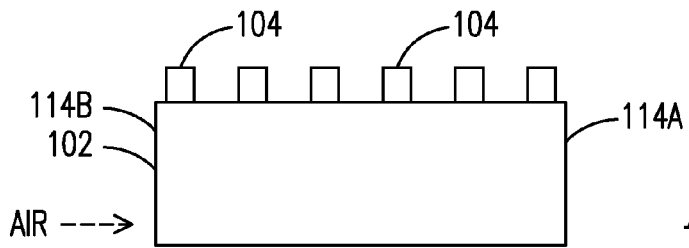
FIGS. 5-8 are exemplary embodiments of fuel scoops of the present invention.

A fuel stream flows through each scoop 102 and exits each scoop at a downstream open end 114A (see the side view of a single scoop 110 in FIG. 5). Arrowheads 118 in FIG. 4 represent fuel flow exiting the scoops 102. An end 114B of each scoop 102 is closed to direct the air flow between adjacent scoops.

The fuel shroud assembly 100 is disposed within the fuel manifold 10 to permit air flow between adjacent scoops as indicated by arrowheads 120 in FIG. 4. The air flow passing between adjacent scoops 102 creates a region of shear 150 proximate to the downstream open ends 114A. The shear causes fuel-air mixing as the fuel exiting the scoops and the air passing between the scoops converge proximate to the downstream open ends 114A.

The fuel shroud assembly 100 ensures proper penetration of the fuel into the manifold channel 12 independent of the fuel/air momentum ratio. The fuel manifold 10 of FIG. 3 can therefore accommodate any fuel type, fuel density and fuel heating value, including natural gas, liquid natural gas, syngas and hydrogen.

In one embodiment, the fuel shroud assembly 100 extends about ⅔ of the distance between the top surface 10A and the bottom surface 10B of the fuel manifold 10. In another embodiment the fuel shroud assembly 100 extends substantially the entire distance between the upper and lower surfaces 10A. In still another embodiment, adjacent scoops 102 are connected with sufficient unobstructed area between scoops to provide adequate air flow (arrowheads 120).

Figure 6:
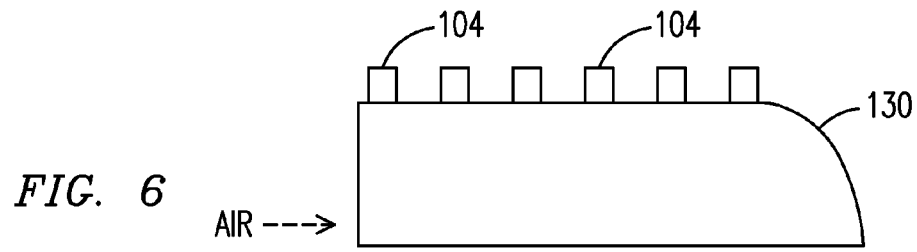

In an embodiment of FIG. 6, the substantially straight edge defining the opening 114A of FIGS. 3 and 4 is replaced by an arcuate edge 130. The curvature of the edge 130 may influence the amount of shear developed proximate the edge and thus the amount of fuel-air mixing. The arcuate edge design may be preferred.

Figure 7:
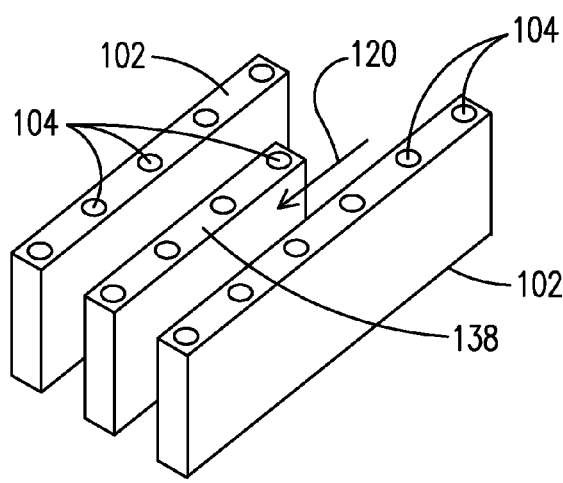

In another embodiment of FIG. 7, the fuel scoops 102 and 138 are not of equal length. In this case also, the fuel and air streams mix in the shear layer downstream of the scoops 102.

Figure 8:
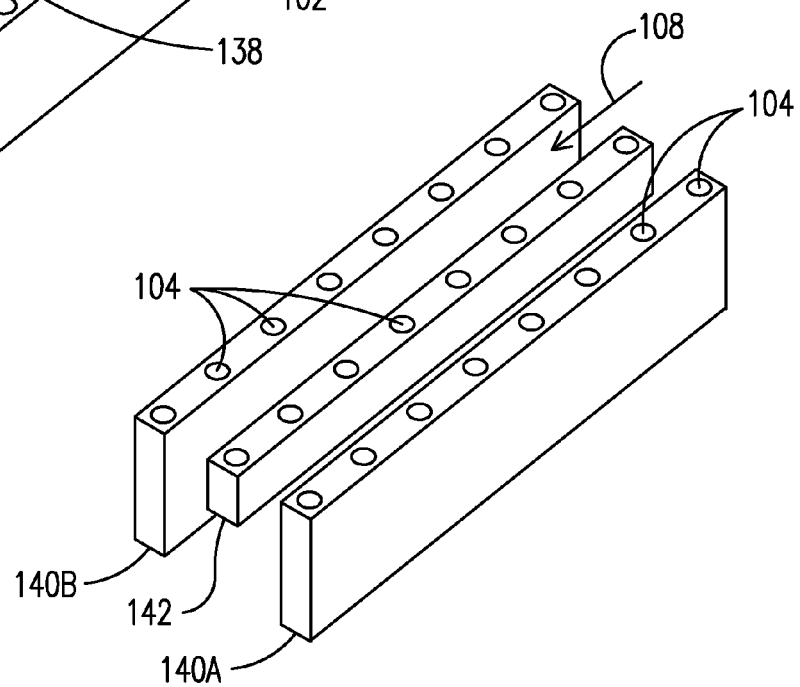

An embodiment of FIG. 8 illustrates scoops 140A and 140B of one width and a scoop 142 of a different width. Therefore the scoops 140A and 140B penetrate farther into the air flow stream than the scoop 142.

Figure 1:
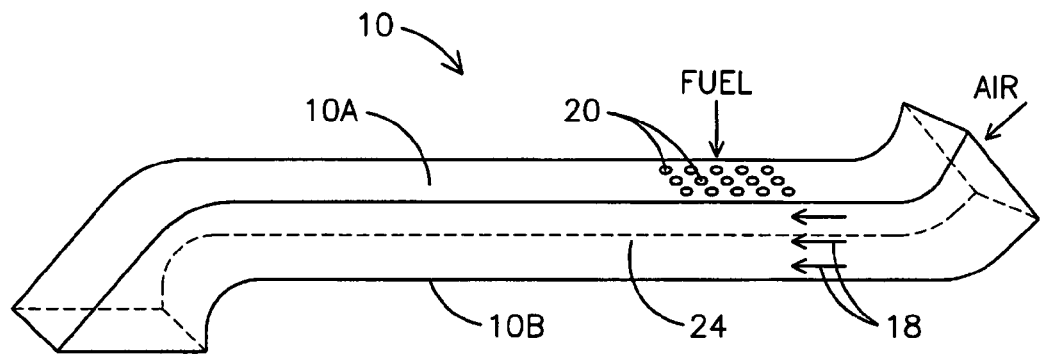
FIGS. 1 and 2 are perspective views of a prior art fuel manifold.
Figure 2:
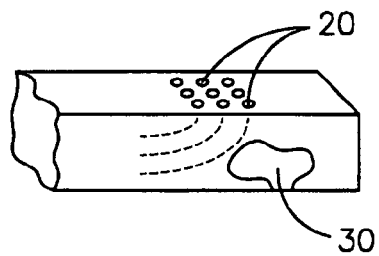
Figure 9:
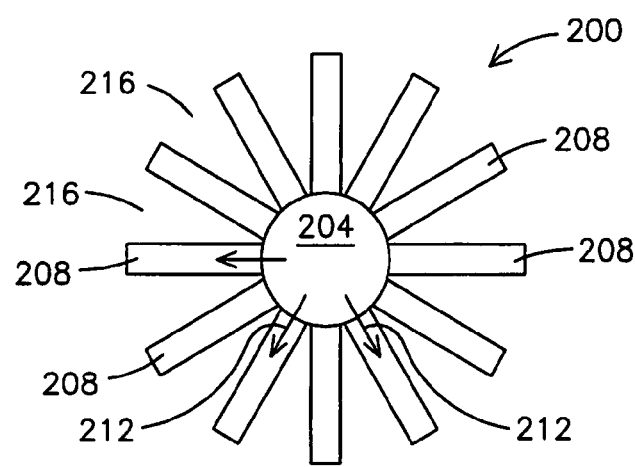
FIG. 9 is an embodiment of the fuel scoop of the present invention as applied to a radial fuel injector.

FIG. 9 illustrates a radial fuel injector comprising a radial fuel assembly 200 having characteristics similar to the fuel assembly 100 of FIG. 3. Fuel flows through a center region 204 and flows into scoops 208 as indicated by arrowheads 212. Air flow in the region between adjacent scoops 208, such as in a region 216, causes proper air/fuel mixing independent of the momentum ratio of the air and the fuel.

This is written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A fuel delivery apparatus for use within a fuel manifold of a gas turbine, the apparatus comprising:

laterally spaced apart fuel scoops, each fuel scoop having a rectangular cross section with the fuel scoops arranged in a parallel configuration, and each defining a plurality of first openings on an external surface thereof for receiving fuel, each one of the fuel scoops directing fuel flow therethrough and the fuel exiting each fuel scoop at a second opening;

adjacent ones of the fuel scoops defining an open channel therebetween, wherein an air stream flows only through the channel in a direction toward the second openings; and wherein the air stream creates a shear region proximate the second openings, and wherein the air stream and the fuel stream mix in the shear region.

2. The fuel delivery apparatus of claim 1 wherein the second opening of each one of the fuel scoops is defined by a straight edge.

3. The fuel delivery apparatus of claim 1 wherein the second opening of each one of the fuel scoops is defined by an arcuate edge.

4. The fuel delivery apparatus of claim 1 wherein each of the fuel scoops extends between an upper surface and a lower surface of the fuel manifold.

5. The fuel delivery apparatus of claim 1 wherein each of the fuel scoops extends about ⅔ of a distance between an upper surface and a lower surface of the fuel manifold.

6. A manifold for mixing fuel and air, the manifold comprising:
an enclosure defining a first air flow channel through which air is directed, the enclosure bounded by an upper and a lower wall surface;
laterally spaced apart fuel scoops, each fuel scoop having a rectangular cross section with the fuel scoops arranged in a parallel configuration, each extending from the upper surface into the air flow channel, each fuel scoop defining a fuel flow channel through which fuel is directed, each fuel scoop further defining a plurality of fuel receiving openings on an external surface thereof for receiving fuel, the fuel directed into the fuel flow channel and exiting the fuel scoops at a fuel outflow opening;
adjacent ones of the fuel scoops defining a second air flow channel therebetween, wherein an air stream flows only through the second air flow channel in a direction toward the fuel outflow openings; and
wherein the air stream creates a shear region proximate the fuel outflow openings, and wherein the air stream and the fuel stream mix in the shear region.

7. The manifold of claim 6 wherein the fuel outflow opening of each one of the fuel scoops is defined by a straight edge.

8. The manifold of claim 6 wherein the fuel outflow opening of each one of the fuel scoops is defined by an arcuate edge.

9. The manifold of claim 6 wherein each of the fuel scoops extends between the upper wall surface and the lower wall surface.

10. The manifold of claim 6 wherein each of the fuel scoops extends about ⅔ of a distance between the upper wall surface and the lower wall surface.

11. A manifold for mixing fuel and air, the manifold comprising:
a first enclosure defining a first air flow channel through which air is directed;
a second enclosure disposed axially within the first air flow channel, wherein fuel is directed through the second enclosure;
fuel scoops extending radially from the second enclosure, wherein fuel is directed from the second enclosure through the fuel scoops and exits the fuel scoops at a fuel outflow opening;
adjacent ones of the fuel scoops defining a second air flow channel therebetween, wherein an air stream of the first air flow channel flows only through the second air flow channel; and
wherein the air stream creates a shear region proximate the fuel outflow openings, and wherein the air stream and the fuel mix in the shear region.

12. The manifold of claim 11 wherein the fuel outflow opening of each one of the fuel scoops is defined by a straight edge.

13. The manifold of claim 11 wherein the fuel outflow opening of each one of the fuel scoops is defined by an arcuate edge.

14. A fuel delivery apparatus for use within a fuel manifold of a gas turbine, the apparatus comprising:
laterally spaced apart fuel scoops, each defining a plurality of first openings for receiving fuel, each one of the fuel scoops directing fuel flow therethrough and the fuel exiting each fuel scoop at a second opening, wherein all fuel scoops extend a same distance into the fuel manifold.
adjacent ones of the fuel scoops defining an open channel therebetween, wherein an air stream flows only through the channel in a direction toward the second openings; and
wherein the air stream creates a shear region proximate the second openings, and wherein the air stream and the fuel stream mix in the shear region.

15. A fuel delivery apparatus for use within a fuel manifold of a gas turbine, the apparatus comprising:
laterally spaced apart fuel scoops, each defining a plurality of first openings for receiving fuel, each one of the fuel scoops directing fuel flow therethrough and the fuel exiting each fuel scoop at a second opening, wherein at least two of the fuel scoops extend a different distance into the fuel manifold;
adjacent ones of the fuel scoops defining an open channel therebetween,
wherein an air stream flows only through the channel in a direction toward the second openings; and
wherein the air stream creates a shear region proximate the second openings, and wherein the air stream and the fuel stream mix in the shear region.

16. A manifold for mixing fuel and air, the manifold comprising:
an enclosure defining a first air flow channel through which air is directed, the enclosure bounded by an upper and a lower wall surface;
laterally spaced apart fuel scoops extending from the upper surface into the air flow channel, each fuel scoop defining a fuel flow channel through which fuel is directed, each fuel scoop further defining a plurality of fuel receiving openings for receiving fuel, the fuel directed into the fuel flow channel and exiting the fuel scoops at a fuel outflow opening, wherein all fuel scoops extend a same distance into the first air flow channel;
adjacent ones of the fuel scoops defining a second air flow channel therebetween, wherein an air stream flows only through the second air flow channel in a direction toward the fuel outflow openings; and
wherein the air stream creates a shear region proximate the fuel outflow openings, and wherein the air stream and the fuel stream mix in the shear region.

17. A manifold for mixing fuel and air, the manifold comprising:
an enclosure defining a first air flow channel through which air is directed, the enclosure bounded by an upper and a lower wall surface;
laterally spaced apart fuel scoops extending from the upper surface into the air flow channel, each fuel scoop defining a fuel flow channel through which fuel is directed, each fuel scoop further defining a plurality of fuel receiving openings for receiving fuel, the fuel directed into the fuel flow channel and exiting the fuel scoops at a fuel outflow opening, wherein at least two of the fuel scoops extend a different distance into the first air flow channel;
adjacent ones of the fuel scoops defining a second air flow channel therebetween, wherein an air stream flows only through the second air flow channel in a direction toward the fuel outflow openings; and
wherein the air stream creates a shear region proximate the fuel outflow openings, and wherein the air stream and the fuel stream mix in the shear region.

* * * * *